(12) United States Patent
Chen et al.

(10) Patent No.: US 12,303,853 B2
(45) Date of Patent: May 20, 2025

(54) EMULSION GEL WITH BOTH A FRESHNESS INDICATION AND A LOW MIGRATION RATE, AND PREPARATION METHOD THEREFOR

(71) Applicant: Jiangnan University, Wuxi (CN)

(72) Inventors: Long Chen, Wuxi (CN); Jiaqi Zhong, Wuxi (CN); Hao Cheng, Wuxi (CN); Kuang He, Wuxi (CN); Ziqiang Lin, Wuxi (CN); Zhengyu Jin, Wuxi (CN); Yun Wang, Wuxi (CN); Liyi Chen, Wuxi (CN); Huichang Zhong, Wuxi (CN); Yaoqi Tian, Wuxi (CN); Jianwei Zhao, Wuxi (CN); Xing Zhou, Wuxi (CN); Jie Long, Wuxi (CN); Chao Qiu, Wuxi (CN); Yidong Zou, Wuxi (CN); Guanxiong Chen, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 18/973,636

(22) Filed: Dec. 9, 2024

(65) Prior Publication Data
US 2025/0099936 A1 Mar. 27, 2025

(30) Foreign Application Priority Data
Dec. 21, 2023 (CN) .......................... 202311763363.6

(51) Int. Cl.
*B01J 13/00* (2006.01)
*B01F 23/41* (2022.01)
*G01N 21/80* (2006.01)

(52) U.S. Cl.
CPC ....... *B01J 13/0056* (2013.01); *B01F 23/4105* (2022.01); *B01J 13/0065* (2013.01); *G01N 21/80* (2013.01)

(58) Field of Classification Search
CPC .................... B01J 13/0052–0069; C08J 3/075
See application file for complete search history.

(56) References Cited

U.S. PATENT DOCUMENTS

2009/0220576 A1* 9/2009 Haug .................... A61K 9/107
424/439

FOREIGN PATENT DOCUMENTS

| CN | 113402734 A |   | 9/2021 |
|---|---|---|---|
| CN | 116559159 A |   | 8/2023 |
| CN | 117820673 A | * | 4/2024 |
| JP | S62127355 A |   | 6/1987 |

OTHER PUBLICATIONS

Machine Translation of CN117820673A. Apr. 5, 2024. (Year: 2024).*
Hawley's Condensed Chemical Dictionary: Sixteenth Edition. p. 660. 2016. (Year: 2016).*
Zhang et al. Effects of secondary cross-linking on the physicochemical properties of sodium alginate-hydrogel and in vitro release of anthocyanins. International Journal of Biological Macromolecules, 2024, 276, 133926. Available online Jul. 22, 2024. (Year: 2024).*
Different Molecular Sieve Sizes and Their Importance Explained. Sorbead India. https://www.molecularsievedesiccants.com/blogs/different-molecular-sieve-sizes-and-their-importance-explained. Jan. 31, 2024. (Year: 2024).*
Peng, Fei et.al. "Research Progress on Enzymatic Acylation of Anthocyanins" Packaging and Food Mechanics V36 No. 1 Feb. 30, 2018.
Daru Seto Bagus Anugrah et. al. ""Development of alginate-based film incorporated with anthocyanins of red cabbage and zinc oxide nanoparticles as freshness indicator for prawns"" International Journal of Biological Macromolecules 251 (126203) Aug. 12, 2023.

* cited by examiner

*Primary Examiner* — Stephen E Rieth
(74) *Attorney, Agent, or Firm* — IPRO, PLLC; Na Xu

(57) ABSTRACT

Disclosed are emulsion gel with both a freshness indication and a low migration rate, and a preparation method therefor. Lipase and organic acid are used and subjected to hydrophobic modification of anthocyanins to obtain acylated anthocyanins, the acylated anthocyanins and oil-phase gel are then dissolved in vegetable oil to form an oil phase, while a sodium alginate aqueous solution is used as a water phase, the oil phase and the water phase are mixed and subjected to high-speed shearing, and calcium carbonate and glucono-δ-lactone are finally added for high-speed shearing to form emulsion gel. The emulsion gel prepared in the present disclosure has both a freshness indication and a low migration rate, and the preparation method of the present disclosure is simple, green, pollution-free and low energy consumption.

3 Claims, 4 Drawing Sheets

EMULSION GEL WITH BOTH A FRESHNESS INDICATION AND A LOW MIGRATION RATE, AND PREPARATION METHOD THEREFOR

TECHNICAL FIELD

The present disclosure belongs to the technical field of food packaging, and particularly relates to emulsion gel with both a freshness indication and a low migration rate, and a preparation method therefor.

BACKGROUND

Food spoilage caused by microbial contamination is a serious issue of food safety. Smart labels are a new type of packaging material with a sensing function, and are capable of detecting pH changes caused by spoilage markers generated from food spoilage inside the package, and displaying color changes to indicate the food freshness, predict quality changes and display the shelf life of the food.

When preparing the smart labels, pigments with sensing functions are often simply mixed with traditional packaging material. However, the smart labels prepared by the mixing method usually have the problems of poor pigment sensitivity and high migration rate, which limit the practical applications of smart labels.

At present, emulsion gel is a method to solve the problems of "poor pigment sensitivity and high migration rate". The migration of pigments is usually controlled by embedding the pigments into emulsion. However, due to the water solubility of anthocyanins, it is often necessary to reduce pigment migration by preparing water-oil emulsion. But an external oil phase cannot allow a pH signal to pass through, which will reduce the sensing sensitivity of smart labels, and make the smart labels unsuitable for practical applications in food freshness detection. Moreover, the conventional emulsion gel used for freshness detection is mostly prepared through rapid cooling of thermal reversible gel, and the gel obtained by the method has poor uniformity and processing property, making it difficult to be applied in an actual production process.

Therefore, there is an urgent need to develop a novel emulsion gel that has both a freshness indication and a low migration rate, which has significant economic value and social importance for food freshness detection and addresses food safety and quality issues.

SUMMARY

Technical Problems

The existing smart labels have poor sensitivity and high pigment migration rate, making them difficult to achieve both high sensitivity and low migration rate.

Technical Solutions

In order to address the above problems, the present disclosure first employs lipase and organic acid to perform hydrophobic modification of anthocyanins to obtain acylated anthocyanins, the acylated anthocyanins and oil-phase gelling agent are then dissolved in vegetable oil to form an oil phase, while a sodium alginate aqueous solution is used as a water phase, the oil phase and the water phase are mixed and subjected to high-speed shearing, and calcium carbonate and glucono-δ-lactone are finally added for high-speed shearing to form emulsion gel. The emulsion gel prepared in the present disclosure has both a freshness indication and a low migration rate, and the preparation method is simple, green, pollution-free and low energy consumption. Compared with the original anthocyanin emulsion gel, the emulsion gel prepared in the present disclosure has an external water phase capable of protecting the leakage of anthocyanins and ensuring the entry of sensor signals, and the resulting emulsion gel exhibits improved stability, low migration rate and excellent sensing performance.

A first objective of the present disclosure is to provide a preparation method for emulsion gel with both a freshness indication and a low migration rate, including the following steps:

dissolving acylated anthocyanins and oil-phase gelling agent in vegetable oil to form an oil phase, using a sodium alginate aqueous solution as a water phase, mixing the water phase and the oil phase at a volume ratio of 7:3-9:1 (mean 7-9:1-3) evenly and performing high-speed shearing, finally adding calcium carbonate and glucono-δ-lactone and performing high-speed shearing again to obtain a mixture, and letting the mixture stand to form gel, that is, the emulsion gel with both a freshness indication and a low migration rate.

In one embodiment of the present disclosure, a preparation method for the acylated anthocyanins is as follows:

mixing anthocyanins, lipase, organic acid, and 4 Å molecular sieve together and dispersing in an organic solvent to obtain a mixture, heating the mixture for acylation reaction, filtering and removing the organic solvent and unreacted ingredients, and drying to obtain the acylated anthocyanins;

where the anthocyanins are one or more of blueberry anthocyanins, roselle anthocyanins, grape anthocyanins, mulberry anthocyanins, black bean anthocyanins, or purple sweet potato anthocyanins; and the lipase is one or more of one or more of Novozym 435, lipase acrylic resin (recombinant) and lipase (*Candida*); the Novozym 435 has an enzyme activity ≥5000 U/g, the lipase acrylic resin (recombinant) has a CAS number of 9001-62-1 and an enzyme activity ≥5000 U/g, and the lipase (*Candida*) has an enzyme activity ≥5000 U/g.

The organic acid is ferulic acid or caffeic acid;

the organic solvent is one or more of n-butanol, isopropanol, tetrahydrofuran, acetonitrile, tert-amyl alcohol, pyridine, or acetone;

a ratio of use amounts of the anthocyanin, lipase, the organic acid, the 4 Å molecular sieve, and the organic solvent is 0.1 g:0.2-0.4 g:1.2-1.4 g:2-4 g:30-60 mL;

the acylation reaction is performed by heating at 40-60° C. for 20-30 hours;

the filtration is suction filtration and aims at removing the lipase and the 4 Å molecular sieve;

the removing the organic solvent and unreacted ingredients is to remove the solvent by rotary evaporation, and to redissolve and use mixed solutions of n-octane/water at a volume ratio of 4:1 and ethyl acetate/water at a volume ratio of 1:4 to eliminate unreacted organic acid and anthocyanins; and drying is to remove the organic solvent by rotary evaporation, redissolving in water, and perform free-drying.

In one embodiment of the present disclosure, the oil-phase gelling agent is one or two of beeswax and glyceryl monooleate, and a mass ratio of the beeswax to the glyceryl monooleate is 2-4:1.

In one embodiment of the present disclosure, a ratio of use amounts of the acylated anthocyanins, the oil-phase gelling agent, and the vegetable oil is 0.6 g:3-5 g:40-60 mL.

In one embodiment of the present disclosure, the vegetable oil is one or more of soybean oil, peanut oil, rapeseed oil, or sesame oil.

In one embodiment of the present disclosure, a ratio of the sodium alginate to water in the sodium alginate aqueous solution is 1-3 g:100 mL.

In one embodiment of the present disclosure, the preparation of the water phase and the oil phase needs to be stirred at 50-70° C. for 20-40 minutes.

In one embodiment of the present disclosure, a ratio of use amounts of the water phase, the calcium carbonate, and the glucono-δ-lactone is 14-18 mL:40-45 mg:65-75 mg.

In one embodiment of the present disclosure, the high-speed shearing is performed at 10,000-14,000 rpm for 2-5 minutes.

In one embodiment of the present disclosure, after letting stand to form the gel, the gel needs to be left stand at 4° C. for more than 10 hours.

A second objective of the present disclosure is to provide emulsion gel with both a freshness indication and a low migration rate prepared by the preparation method according to the present disclosure.

In one embodiment of the present disclosure, the emulsion gel with both a freshness indication and a low migration rate has a water-oil structure.

A third objective of the present disclosure is to provide application of the emulsion gel with both a freshness indication and a low migration rate in packaging material, wearable material, or degradable material.

In one embodiment of the present disclosure, the emulsion gel can be tailored according to the specifications and dimensions of a packaging object for use as packaging material.

A fourth objective of the present disclosure is to provide application of the emulsion gel with both a freshness indication and a low migration rate in the fields of food, pharmaceuticals, or agricultural products.

In one embodiment of the present disclosure, the application of the emulsion gel in the food mainly involves the use as packing material for food, enabling food freshness detection.

In one embodiment of the present disclosure, the food is a meat product or an aquatic product.

A fifth objective of the present disclosure is to provide a smart label for detecting food freshness, which uses the emulsion gel with both a freshness indication and a low migration rate.

In one embodiment of the present disclosure, the emulsion gel with both a freshness indication and a low migration rate can be directly used as a smart label on a surface of food.

In one embodiment of the present disclosure, the smart label uses the emulsion gel with both a freshness indication and a low migration rate as a detection matrix, and food freshness is determined according to changes in color of the smart label.

In one embodiment of the present disclosure, the food is a meat product or an aquatic product.

In one embodiment of the present disclosure, the meat product is one of beef, pork, mutton, or chicken.

In one embodiment of the present disclosure, the aquatic product is one of fish or shrimp.

A sixth objective of the present disclosure is to provide a method for detecting food freshness, and the method adopts the emulsion gel with both a freshness indication and a low migration rate according to the present disclosure.

In one embodiment of the present disclosure, the method uses the emulsion gel with both a freshness indication and a low migration rate as a detection matrix, and food freshness is determined according to changes in color of the smart label.

A seventh objective of the present disclosure is to provide a method for improving the detection sensitivity of a smart label of anthocyanins and reducing a migration rate of anthocyanins, including the following steps:

dissolving acylated anthocyanins and oil-phase gelling agent in vegetable oil to form an oil phase, using a sodium alginate aqueous solution as a water phase, mixing the water phase and the oil phase at a volume ratio of 7:3-9:1 (mean 7-9:1-3) evenly and performing high-speed shearing, finally adding calcium carbonate and glucono-δ-lactone and performing high-speed shearing again to obtain a mixture, and letting the mixture stand to obtain the emulsion gel with both a freshness indication and a low migration rate, that is, the smart label.

Beneficial Effects (1) The present disclosure prepares the emulsion gel with both a freshness indication and a low migration rate based on color rendering property of anthocyanins that changes with pH, and the binding characteristics that acylated (hydrophobic) anthocyanins can be distributed at an interface of the emulsion gel phase, where the acylated (hydrophobic) anthocyanins are effectively constrained and protected by the oil phase, improving the stability and reducing the migration rate thereof. In addition, the external water phase can protect the stability of the anthocyanins without interfering with pH signals, thereby forming the emulsion gel with both a freshness indication and a low migration rate.

(2) The emulsion gel prepared in the present disclosure is complete and continuous, and exhibits lower migration rate and excellent sensing performance, can effectively indicate food freshness and shelf life, therefore, it can be used as a smart label in the field of food packaging.

DETAILED DESCRIPTIONS OF THE EMBODIMENTS

Figure 1:
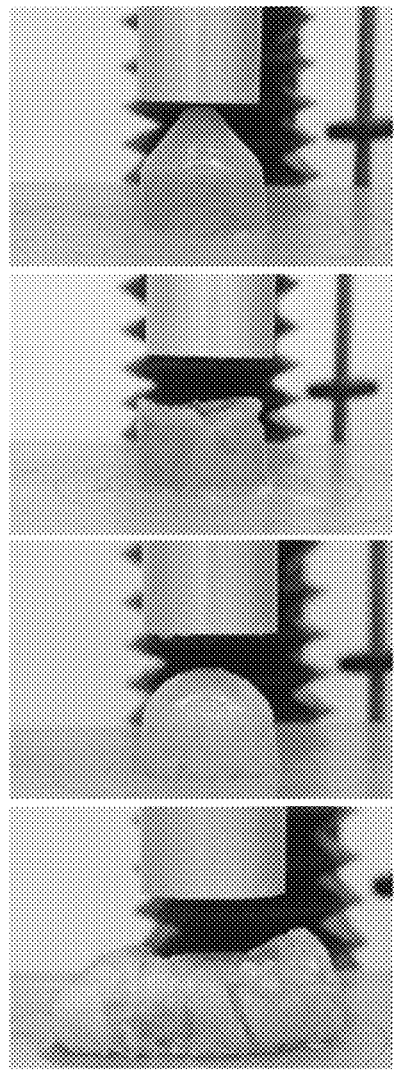
FIG. 1 shows physical images of emulsion gels prepared in Examples 1, 2, 3 and Comparative Example 3 at different ratios of a water phase to an oil phase.

The present disclosure will be further described below in conjunction with examples, but the examples do not impose any limitation on the scope of the present disclosure in any form. Unless otherwise specified, the reagents, methods, and equipment used in the present disclosure are conventional reagents, methods, and equipment in the relevant technical field.

Test Method:

1. Determination of Pigment Lipid Solubility:

1-Octanol and water were mixed and stirred overnight to achieve mutual saturation, two phases thereof were then separated, a sample was added to water-saturated 1-Octanol, and an absorbance $A_1$ of the sample at 540 nm were measured, an equal volume of 1-Octanol-saturated water was added and subjected to thorough vortex for mixing, and allowed to be separated into layers, an upper phase of 1-Octanol was aspirated and an absorbance $A_2$ was then measured, and a pigment lipid solubility (log P) was calculated according to Formula (1):

$$\log P = \frac{A_2}{A_1 - A_2} \quad (1)$$

2. Determination of Color Rendering Capability:

Sodium hydroxide/hydrochloric acid aqueous solutions with pH values of 2, 3, 4, 5, 6, 7, 8, 9, 10, 11, and 12 were prepared respectively, samples were immersed in the solutions with different pH values for 30 minutes, changes in color of the samples were recorded using a camera, and photo data were converted into CIE L*a*b* color values using ImageJ, where L* indicated lightness with values from 0 (black) to 100 (white), a* indicated green (−a*) to red (+a*), and b* indicated blue (−b*) to yellow (+b*). A total color difference (TCD) was calculated according to Formula (2).

$$TCD(\Delta E) = \sqrt{(L^* - L_0^*)^2 - (a^* - a_0^*)^2 - (b^* - b_0^*)^2} \quad (2)$$

Initial color parameters were expressed as $L^*_0$, $a^*_0$ and $b^*_0$.

3. Determination of Pigment Migration Rate:

A label was immersed in water, solution was taken once every other day, and an absorbance of the solution was measured to monitor and record leakage thereof.

4. Determination of Ammonia Sensitivity:

100 mg/mL ammonia solution was prepared, a sample under test had a size of Φ25 mm×10 mm, 10 mL of ammonia solutions with different concentrations was poured openly into a cylindrical container with a size of 20 mm×15 mm, which was placed together with the sample in a square transparent container with dimensions of 100 mm×100 mm×20 mm, changes in color of the sample were recorded using a camera every 5 minutes.

EXPERIMENTAL MATERIAL

Blueberry anthocyanins (5-25%) purchased from Nanjing Xinhou Biological Co., Ltd.;

Lipase (*Candida*) (enzyme activity ≥5000 U/g) and beeswax purchased from Shanghai Titan Scientific Co., Ltd.;

Lipase acrylic resin (recombinant) (enzyme activity ≥5000 U/g), ferulic acid, ferulic acid methyl ferulate, isooctane, ethyl acetate, glyceryl monooleate, and sodium alginate purchased from Shanghai Aladdin Biochemical Technology Co., Ltd.;

Lipase (enzyme activity is 20000 U/g, L874984), caffeic acid, tert-amyl alcohol, and 1-Octanol purchased from Shanghai Macklin Biochemical Co., Ltd.;

Calcium carbonate: ≥99% purchased from Shanghai Titan Scientific Co., Ltd.;

Glucono-δ-lactone purchased from Sinopharm Chemical Reagent Co., Ltd.;

Soybean oil purchased from Yihai Kerry Arawana Holdings Co., Ltd.

Example 1

A preparation method for emulsion gel with both a freshness indication and a low migration rate, including the following steps:

(1) 100 mg of the blueberry anthocyanins, 300 mg of the lipase acrylic resin (recombinant), 1.35 g of the ferulic acid, and 3 g of 4 Å molecular sieve were mixed and dispersed in 50 mL of the tert-amyl alcohol and continuously stirred (at 500 rpm for 10 minutes), and reaction was performed by stirring in a 50° C. water bath for 24 hours to obtain a mixture;

the mixture was subjected to suction filtration to remove the lipase acrylic resin (recombinant) and the 4 Å molecular sieve, organic solvent was removed by rotary evaporation, and the mixture was redissolved with anhydrous methanol; and the redissolved mixture was extracted with mixed solution of n-octane/water solution in a volume ratio of 4:1 and mixed solution of ethyl acetate/water in a volume ratio of 1:4 to remove unreacted ferulic acid and blueberry anthocyanins, organic solvent was removed again by rotary evaporation, and the mixture was redissolved in water again and freeze-fried at −50° C. for 48 hours to obtain acylated anthocyanin powder;

(2) 3 g of the beeswax, 1 g of the glyceryl monooleate, and 0.6 g of the acylated anthocyanin powder were dissolved in 50 mL of the soybean oil, and stirred at 70° C. for 30 minutes to prepare an oil phase; and 2 g of the sodium alginate was dissolved in 100 ml of water and stirred at 70° C. for 30 minutes to prepare a water phase for later use; and 14 mL of the water phase and 6 mL of the oil phase were taken and mixed to obtain a mixture, the mixture was sheared on a shearing machine at 12,000 rpm for 2 minutes, 42 mg of calcium carbonate and 70 mg of glucono-δ-lactone were finally added in the mixture, the mixture was continuously sheared at 12,000 rpm for another 2 minutes, and then left undisturbed to form gel, the gel was put in a 4° C. refrigerator for 12 hours and then taken out for cutting to obtain the emulsion gel with both a freshness indication and a low migration rate.

Example 2

The water phase and the oil phase in the step (2) of Example 1 were adjusted to 16 mL and 4 mL, respectively, and other conditions were the same as those in Example 1 to obtain the emulsion gel with both a freshness indication and a low migration rate.

Example 3

The water phase and the oil phase in the step (2) of Example 1 were adjusted to 18 mL and 2 mL, respectively, and other conditions were the same as those in Example 1 to obtain the emulsion gel with both a freshness indication and a low migration rate.

Example 4

The lipase acrylic resin (recombinant) in the step (1) of Example 1 was replaced by lipase (*Candida*), and other conditions were the same as those in Example 1 to obtain the emulsion gel with both a freshness indication and a low migration rate.

Example 5

The ferulic acid in the step (1) of Example 1 was replaced by caffeic acid, and other conditions were the same as those in Example 1 to obtain the emulsion gel with both a freshness indication and a low migration rate.

Comparative Example 1

The lipase acrylic resin (recombinant) in the step (1) of Example 1 was replaced by lipase (L874984), and other conditions were the same as those in Example 1 to obtain emulsion gel.

Comparative Example 2

The ferulic acid in the step (1) of Example 1 was replaced by ferulic acid methyl ferulate, and other conditions were the same as those in Example 1 to obtain emulsion gel.

Comparative Example 3

The water phase and the oil phase in the step (2) of Example 1 were adjusted to 12 mL and 8 mL, respectively, and other conditions were the same as those in Example 1 to obtain emulsion gel.

Comparative Example 4

The acylation step in the step (1) of Example 1 was omitted, the blueberry anthocyanins were used directly, and other conditions were the same as those in Example 1 to obtain emulsion gel.

The emulsion gels prepared in Examples 1-5 and Comparative Examples 1-4 were subjected to performance test, and test results were as follows:

FIG. 1 shows physical images of emulsion gels prepared in Examples 1, 2, 3 and Comparative Example 3 at different ratios of a water phase to an oil phase. Table 1 itemizes texture data of emulsion gels prepared in Examples 1, 2, 3 and Comparative Example 3 at different ratios of a water phase to an oil phase. As can be seen from FIG. 1 and Table 1, with an increase of the oil phase content, the emulsion gel exhibits a significant decrease in hardness, elasticity, and adhesive property, an increase in the oil phase makes the emulsion gel gradually show more characteristics of oil gel, but a shape of gel is difficult to maintain at a water-oil ratio of 6:4, indicating that a water-oil ratio range of 7:3-9:1 that maintains a relatively moderate strength of the emulsion gel and is convenient for processing.

Figure 2:
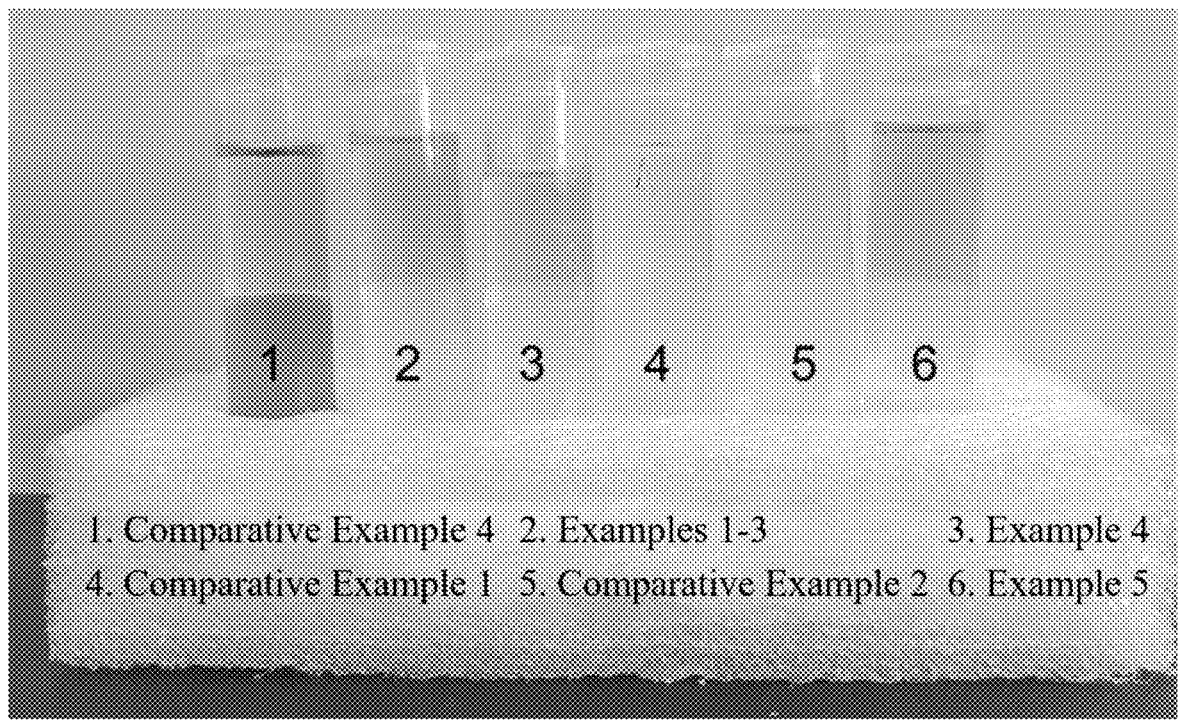
FIG. 2 is a lipid solubility effect diagram of (acylated) anthocyanins in emulsion gels prepared in Examples 1-5 and Comparative Examples 1, 2 and 4.
Figure 3:
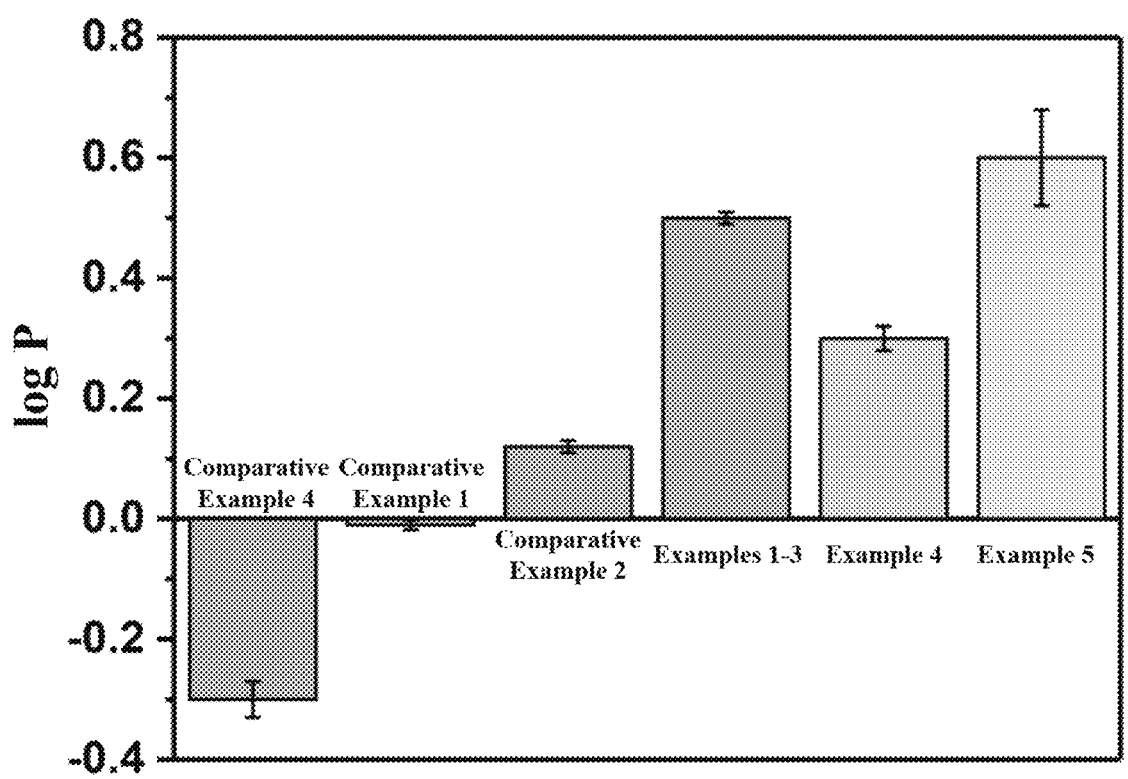
FIG. 3 is a lipid solubility data diagram of (acylated) anthocyanins in emulsion gels prepared in Examples 1-5 and Comparative Examples 1, 2 and 4.

FIGS. 2 and 3 are lipid solubility effect diagram and data diagram of (acylated) anthocyanins in emulsion gels prepared in Examples 1-5 and Comparative Examples 1, 2 and 4. It can be seen from FIGS. 2 and 3, without being acylated, the emulsion gel prepared in Comparative Example 4 shows obvious strong water solubility, which is further confirmed in FIG. 3, and its log P is −0.2, indicating strong hydrophilicity. Examples 1-5 indicate that, after being acylated, lipid solubility of the anthocyanins is significantly improved, and the color is concentrated in an upper layer of 1-Octanol phase. The improvement of lipid solubility is conducive to reducing the leakage of anthocyanins and the formation of subsequent water-oil emulsion. The improvement of lipid solubility of the emulsion gels prepared in Comparative Examples 1 and 2 is obviously poor, indicating that ordinary lipase and ferulic acid methyl ferulate cannot have a good enzymatic acylation reaction with anthocyanins to improve the lipid solubility of anthocyanins.

Figure 4:
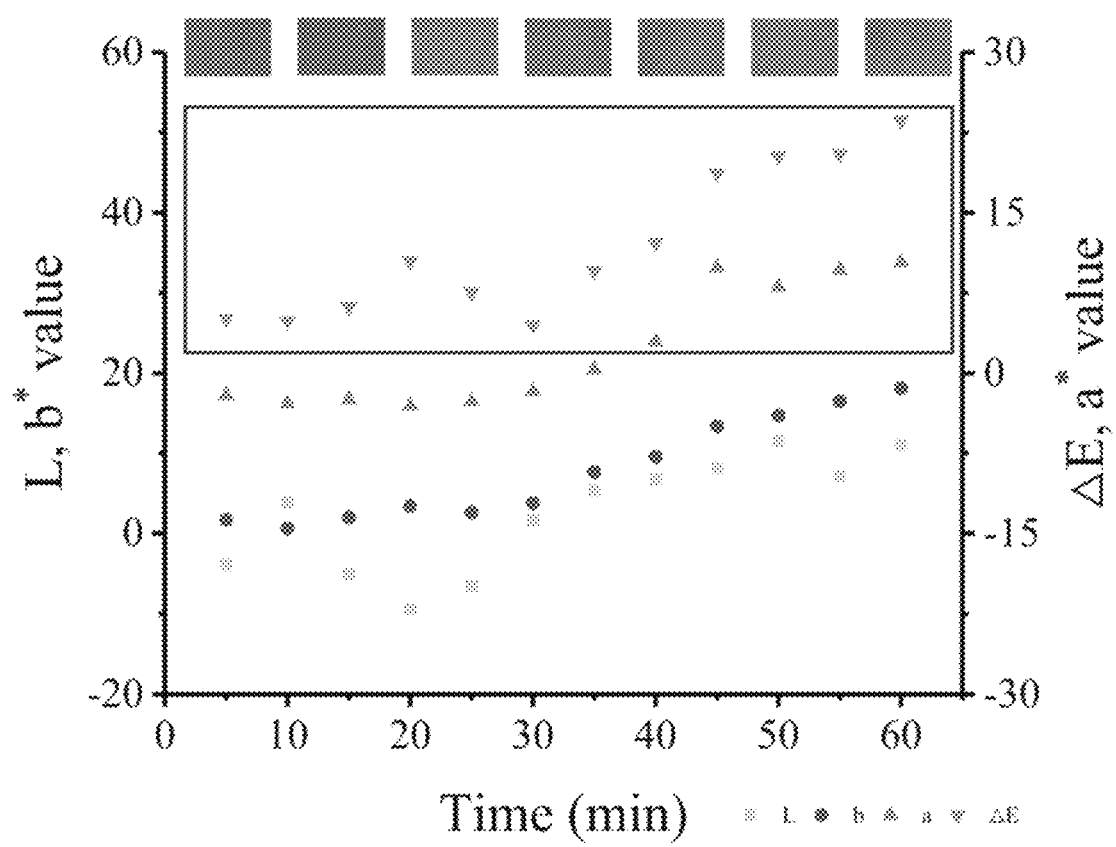
FIG. 4 is a sensing effect diagram of emulsion gel prepared in Example 1 in an ammonia environment.

FIG. 4 is a sensing effect diagram of emulsion gel prepared in Example 1 in an ammonia environment. Table 2 shows changes in color of the emulsion gel prepared in Example 1 in an ammonia environment over time. As can be seen from FIG. 4 and Table 2, in an ammonia environment, the emulsion gel prepared in Example 1 generates a color response of a $\Delta E > 5$, indicating that the smart label prepared using the emulsion gel in Example 1 has a good response to ammonia and can be used for food freshness detection.

TABLE 2

Changes in color of the emulsion gel prepared in Example 1 in an ammonia environment over time

| Time | L* | a* | b* | ΔE |
|---|---|---|---|---|
| 0 | 0.00 ± 0.00 | 0.00 ± 0.00 | 0.00 ± 0.00 | 0.00 ± 0.00 |
| 5 | −3.90 ± 2.72 | −2.06 ± 0.22 | 1.69 ± 0.64 | 5.09 ± 1.57 |
| 10 | 3.81 ± 2.05 | −2.84 ± 0.19 | 0.61 ± 0.60 | 4.88 ± 1.84 |
| 15 | −5.11 ± 2.09 | −2.45 ± 0.61 | 1.98 ± 0.73 | 6.18 ± 1.48 |
| 20 | −9.36 ± 1.35 | −3.08 ± 0.45 | 3.41 ± 0.42 | 10.45 ± 1.16 |

TABLE 1

Texture of emulsion gels prepared in different examples and comparative examples

| Example | Water-oil ratio | Hardness/g | Elasticity | Viscosity | Adhesive property |
|---|---|---|---|---|---|
| Example 3 | 9:1 | 252.54 ± 13.07 | 0.899 ± 0.007 | −18.22 ± 2.69 | 181.06 ± 8.41 |
| Example 2 | 8:2 | 200.20 ± 27.30 | 0.840 ± 0.005 | −34.18 ± 6.55 | 114.74 ± 19.07 |
| Example 1 | 7:3 | 175.78 ± 29.68 | 0.825 ± 0.009 | −38.09 ± 19.20 | 97.04 ± 24.11 |
| Comparative Example 3 | 6:4 | — | — | — | — |

TABLE 2-continued

Changes in color of the emulsion gel prepared in
Example 1 in an ammonia environment over time

| Time | L* | a* | b* | ΔE |
|---|---|---|---|---|
| 25 | −6.51 ± 1.00 | −2.66 ± 0.79 | 2.60 ± 1.38 | 7.55 ± 1.53 |
| 30 | 1.61 ± 0.33 | −1.70 ± 0.81 | 3.74 ± 0.27 | 4.47 ± 0.20 |
| 35 | 5.32 ± 2.79 | 0.34 ± 0.68 | 7.61 ± 0.27 | 9.54 ± 1.23 |
| 40 | 6.73 ± 2.23 | 2.94 ± 0.87 | 9.51 ± 0.73 | 12.15 ± 1.23 |
| 45 | 8.17 ± 3.42 | 9.86 ± 0.95 | 13.31 ± 0.57 | 18.67 ± 1.35 |
| 50 | 11.43 ± 1.22 | 8.06 ± 0.67 | 14.63 ± 0.98 | 20.26 ± 1.31 |
| 55 | 7.14 ± 1.58 | 9.66 ± 1.55 | 16.49 ± 0.38 | 20.46 ± 1.12 |
| 60 | 11.02 ± 1.70 | 10.35 ± 0.27 | 18.11 ± 1.18 | 23.62 ± 1.65 |

Figure 5:
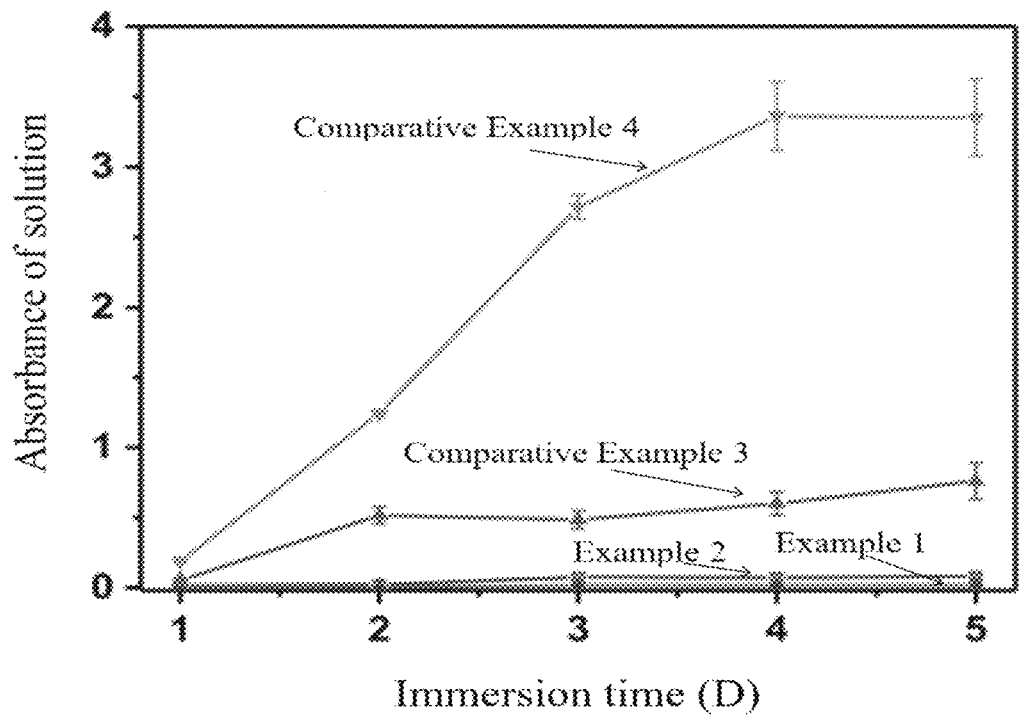
FIG. 5 shows a pigment (anthocyanins) migration effect diagram of emulsion gels prepared in Examples 1-2 and Comparative Examples 3-4 after being immersed in water.

FIG. 5 shows a pigment (anthocyanins) migration effect diagram of emulsion gels prepared in Examples 1-2 and Comparative Examples 3-4 after being immersed in water. As can be seen from FIG. 5, the emulsion gels prepared in Examples 1 and 2 maintain extremely low pigment (anthocyanins) leakage after 5 days of immersion, while the unmodified anthocyanins in Comparative Example 4 is prone to leak due to its excessive hydrophilicity; the emulsion gel at a water-oil ratio of 6:4 in Comparative Example 3 also shows higher pigment migration rate, which, however, is smaller than that in Comparative Example 4, indicating that only acylated pigment can exist at an water-oil gel interface, thus producing a certain degree of protection against pigment leakage. However, the protection effect is relatively limited due to a poor strength of emulsion gel.

Comparative Example 5

A temperature of the water phase and the oil phase in the step (2) of Example 1 was adjusted by from 70° C. to 30° C., and other conditions were the same as those in Example 1 to obtain emulsion gel.

Results indicated that the beeswax could not dissolve properly due to a low temperature, resulting in the stratification of the prepared emulsion gel.

Comparative Example 6

The step (2) of Example 1 was adjusted as follows:
3 g of the beeswax, 1 g of the glyceryl monooleate, and 0.6 g of the acylated anthocyanin powder were dissolved in 50 mL of the soybean oil, and stirred at 70° C. for 30 minutes to prepare an oil phase; and 2 g of the sodium alginate was dissolved in 100 ml of water and stirred at 70° C. for 30 minutes to prepare a water phase for later use; and 14 mL of the water phase, 6 mL of the oil phase, 42 mg of calcium carbonate and 70 mg of glucono-δ-lactone were taken and sheared on a shearing machine.

Results indicated that since the solution was too viscos, it was impossible to achieve high-speed shearing to from emulsion gel, and forced shearing could damage a probe. It can be seen that the conventional method of adding sodium alginate, calcium carbonate, and glucono-δ-lactone simultaneously to prepare the emulsion gel is unsuitable for acylated anthocyanins.

Example 6

A preparation method for emulsion gel with both a freshness indication and a low migration rate, including the following steps:
(1) 100 mg of the blueberry anthocyanins, 300 mg of the lipase acrylic resin (recombinant), 1.35 g of the ferulic acid, and 3 g of 4 Å molecular sieve were mixed and dispersed in 50 mL of the tert-amyl alcohol and continuously stirred (at 500 rpm for 10 minutes), and stirred for reacting in a 50° C. water bath for 24 hours to obtain a mixture;

the mixture was subjected to suction filtration to remove the lipase acrylic resin (recombinant) and the 4 Å molecular sieve, organic solvent was removed by rotary evaporation, the mixture was redissolved with anhydrous methanol; the redissolved mixture was extracted with mixed solution of n-octane/water solution in a volume ratio of 4:1 and mixed solution of ethyl acetate/water in a volume ratio of 1:4 to remove unreacted ferulic acid and blueberry anthocyanins, organic solvent was removed again by rotary evaporation, and the mixture was redissolved in water again and freeze-fried at −50° C. for 48 hours to obtain acylated anthocyanin powder;

(2) 4 g of the beeswax, 1 g of the glyceryl monooleate, and 0.6 g of the acylated anthocyanin powder were dissolved in 50 mL of the soybean oil, and stirred at 70° C. for 30 minutes to prepare an oil phase; and 2 g of the sodium alginate was dissolved in 100 ml of water and stirred at 70° C. for 30 minutes to prepare a water phase for later use; and 14 mL of the water phase and 6 mL of the oil phase were taken and mixed to obtain a mixture, the mixture was sheared on a shearing machine at 12,000 rpm for 2 minutes, 40 mg of calcium carbonate and 75 mg of glucono-δ-lactone were finally added in the mixture, the mixture was continuously sheared at 12,000 rpm for another 2 minutes, and then left undisturbed to form gel, the gel was put in a 4° C. refrigerator for 12 hours and then taken out for cutting to obtain the emulsion gel with both a freshness indication and a low migration rate.

Example 7

A preparation method for emulsion gel with both a freshness indication and a low migration rate, including the following steps:
(1) 100 mg of the blueberry anthocyanins, 300 mg of the lipase acrylic resin (recombinant), 1.35 g of the ferulic acid, and 3 g of 4 Å molecular sieve were mixed and dispersed in 50 mL of the tert-amyl alcohol and continuously stirred (at 500 rpm for 10 minutes), and stirred for reacting in a 50° C. water bath for 24 hours to obtain a mixture;

the mixture was subjected to suction filtration to remove the lipase acrylic resin (recombinant) and the 4 Å molecular sieve, organic solvent was removed by rotary evaporation, the mixture was redissolved with anhydrous methanol; the redissolved mixture was extracted with mixed solution of n-octane/water solution in a volume ratio of 4:1 and mixed solution of ethyl acetate/water in a volume ratio of 1:4 to remove unreacted ferulic acid and blueberry anthocyanins, organic solvent was removed again by rotary evaporation, and the mixture was redissolved in water again and freeze-fried at −50° C. for 48 hours to obtain acylated anthocyanin powder;

(2) 2 g of the beeswax, 1 g of the glyceryl monooleate, and 0.6 g of the acylated anthocyanin powder were dissolved in 50 mL of the soybean oil, and stirred at 70° C. for 30 minutes to prepare an oil phase; and 2 g of the sodium alginate was dissolved in 100 ml of water and stirred at 70° C. for 30 minutes to prepare a water phase for later use; and 14 mL of the water phase and 6 mL of the oil phase were taken and mixed to obtain a mixture, the mixture was sheared on a shearing machine at 12,000 rpm for 2 minutes, 45 mg of calcium carbonate and 65 mg of glucono-δ-lactone were finally added in the mixture, the mixture was continuously sheared at 12,000 rpm for another 2 minutes, and then left undisturbed to form gel, the gel was put in a 4° C. refrigerator for 12 hours and then taken out for cutting to obtain the emulsion gel with both a freshness indication and a low migration rate.

The emulsion gels with both a freshness indication and a low migration rate prepared in Examples 6 and 7 were subjected to performance test, and test results were as follows:

The emulsion gels with both a freshness indication and a low migration rate prepared in Examples 6 and 7 had moderate strength and were easy to process, and they still maintained extremely low pigment (anthocyanins) leakage after 5 days of immersion, they had good response to ammonia and could be used as smart labels for food freshness detection.

What is claimed is:

1. A method comprising:
dissolving acylated anthocyanins and an oil-phase gelling agent in vegetable oil to form an oil phase, using a sodium alginate aqueous solution as a water phase, mixing the water phase and the oil phase at a volume ratio of between 7:3 and 9:1 and performing shearing at 10,000-14,000 rpm, adding calcium carbonate and glucono-δ-lactone and performing shearing again at 10,000-14,000 rpm to obtain a first mixture, and letting the first mixture stand to form an emulsion gel;
wherein
a ratio of the acylated anthocyanins, the oil-phase gelling agent, and the vegetable oil is 0.6 g:3-5 g:40-60 mL; and
a ratio of use amounts of the water phase, the calcium carbonate, and the glucono-δ-lactone is 14-18 mL:40-45 mg:65-75 mg.

2. The method according to claim 1, further comprising:
forming the acylated anthocyanins by mixing and dispersing anthocyanins, lipase, organic acid, and 4 Å molecular sieve in an organic solvent to obtain a second mixture and, heating the second mixture to perform an acylation reaction.

3. The preparation method according to claim 1, further comprising stirring at 50-70° C. for 20-40 minutes the acylated anthocyanins and the oil-phase gelling agent in the vegetable oil.

* * * * *